Jan. 7, 1936.  P. A. JANSSENS  2,026,681
MEASURING DEVICE
Filed Oct. 2, 1933    2 Sheets-Sheet 1
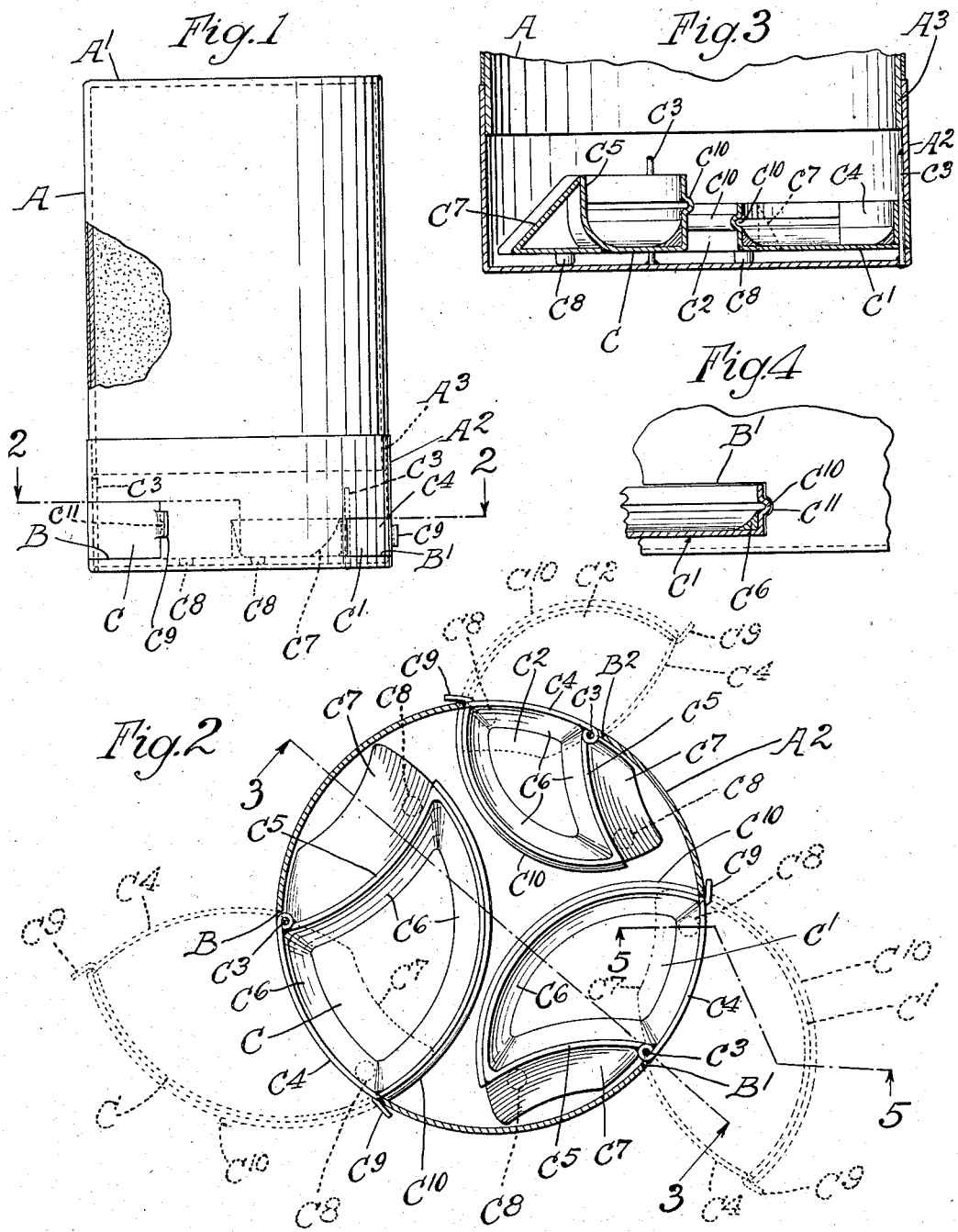
Inventor
Peter A. Janssens
by Parker & Carter
Attorneys.

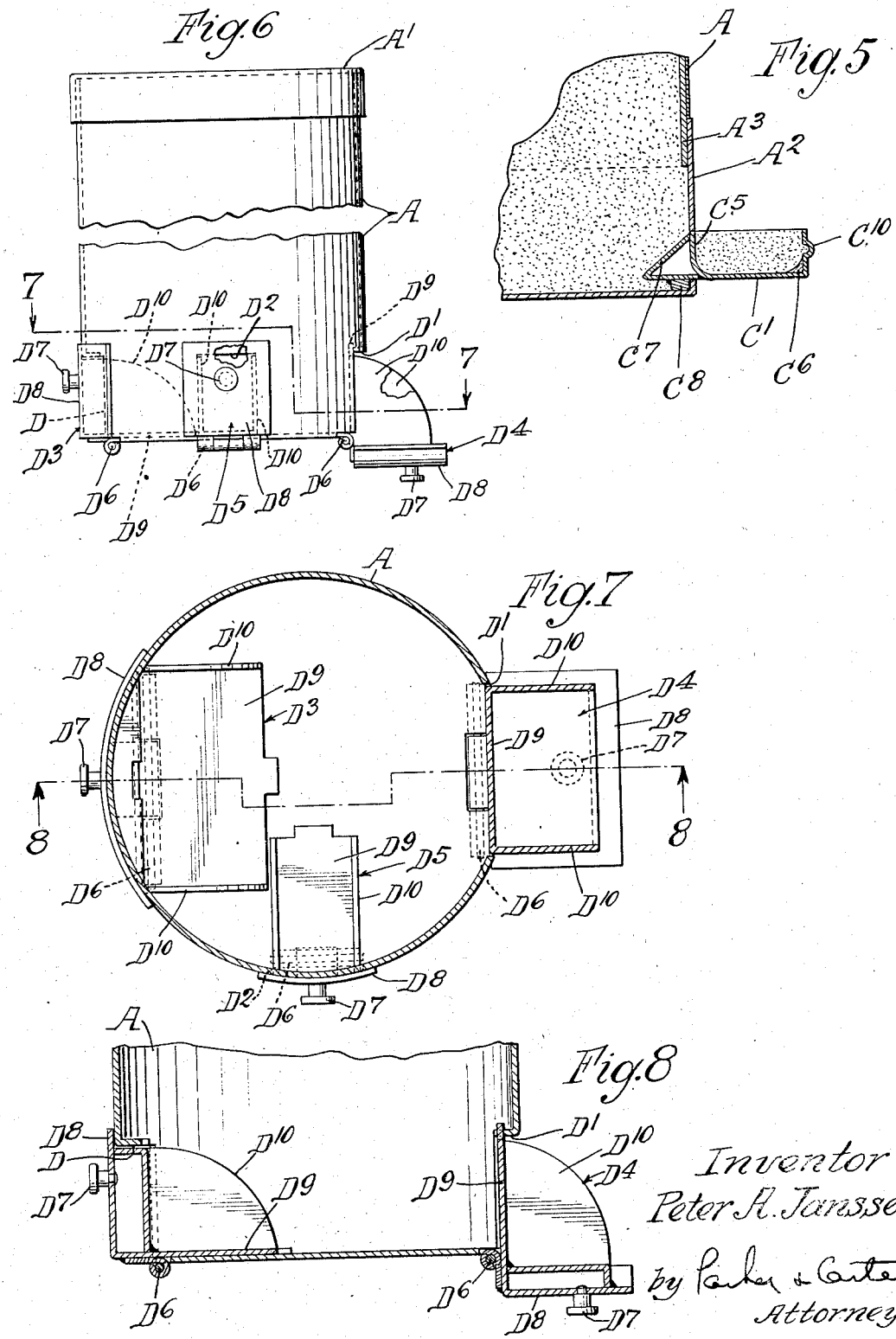

Patented Jan. 7, 1936

2,026,681

UNITED STATES PATENT OFFICE 2,026,681

MEASURING DEVICE

Peter A. Janssens, Chicago, Ill.

Application October 2, 1933, Serial No. 691,756

10 Claims. (Cl. 221—98)

My invention relates to a dispensing container or measuring device. One purpose is the provision of means for delivering a measured quantity of material from a container. Another purpose is the provision of means for selectively delivering different but precisely measured quantities from a container. Another object is the provision of means for measuring and removing from a container a predetermined charge of material, without permitting the escape of additional material from the container. Another object is the provision of a measuring device which can be associated integrally with a container, or which, if preferred, can be removably applied to a container. For example, baking powder might be sold in a can provided with one of my dispensing devices. Or the dispensing device may be formed separately from and later added to the can, the purchaser applying it to the can after purchase of the can and replacing empty cans by full ones from time to time, as the contents become exhausted in use. Other objects will appear from time to time in the course of the specification and claims.

I illustrate my invention more or less diagrammatically in the accompanying drawings, wherein—

Figure 1 is a side elevation with parts in section;

Figure 2 is a section on the line 2—2 of Figure 1;

Figure 3 is a section on the line 3—3 of Figure 2;

Figure 4 is a detail;

Figure 5 is a section on the line 5—5 of Figure 2; and

Figure 6 is a view similar to Figure 1 of a variant form;

Figure 7 is a section on the line 7—7 of Figure 6; and

Figure 8 is a section on the line 8—8 of Figure 7.

Like parts are indicated by like symbols throughout the specification and drawings.

Referring to the drawings, and particularly to the form of Figure 1, A indicates a container, herein shown as cylindrical. It may be a container adapted and ready for sale in a store, for example a container of salt, sugar, baking powder, or the like. It may have any suitable end closure $A^1$. Formed in the cylindrical side and preferably adjacent the end opposite to the closure $A^1$ are a plurality of apertures B, $B^1$ and $B^2$ of different size and preferably situated at the same level. In Figures 1 and following I illustrate these apertures as formed in a separate cylindrical member $A^2$ which may overlap with the end flange $A^3$ of the container A, it being understood that the original end cap or closure of the container A, not shown, has been removed. It will be realized, however, and it is thought that no additional showing in the drawings is needed, that the container A and the member $A^2$ may if desired be permanently secured to each other or be formed integrally. However, there is an advantage in forming them separately, because as the contents of each container A are exhausted, the empty container may be thrown away and a new container fitted in or secured to the member $A^2$.

Associated with each aperture B, $B^1$, and $B^2$ is a dispensing member, the members being indicated respectively as C, $C^1$, and $C^2$. Each such container is pivoted, as at $C^3$, for rotation about an axis parallel to the axis or long extension of the container A. Each such container has a face $C^4$ adapted snugly to close the aperture when the dispensing member is in closed position. It has another face $C^5$ adapted to close the aperture when the dispensing member is in open or dispensing position. The members C, $C^1$ and $C^2$ are shown as formed of sheet metal and in order to prevent sharp corners and narrow spaces in which material may adhere they are provided with inclined or sloping fillets $C^6$. $C^7$ indicates a sloping inward projection of the inner closure wall $C^5$. Preferably it hugs the bottom of the container in such fashion that when the dispensing member is pushed back into closed position it plows readily through the finely divided material and takes its proper closed position. While the bottom of the container is close to the bottom of the member $A^3$, still it is not desirable to have a grinding action take place whereby particles of the material may be ground. This is particularly true when baking powder is being dispensed. I therefore provide small spacing members $C^8$ which slightly space the bottom of the dispensing member from the bottom of the container. These members $C^8$ may have the additional function of limiting the outward withdrawal of the dispensing members. I may provide any suitable outwardly extending handle member $C^9$, whereby the dispensing members may be drawn outwardly into dispensing position. The handle member may also be so formed as to limit the inward movement of the dispensing member. Or the dispensing member may be so formed as to make any stop unnecessary, as by contact with the inner face of the can. Such a proportion of parts is indicated in Figure 2. In order to align or control the movement of the dispensing members I may also form them with side flanges $C^{10}$ on their arcuate sides. These flanges serve as guides which penetrate notches $C^{11}$ formed in the side of the apertures B, $B^1$, and $B^2$.

Referring to the form of Figures 6 to 8, I illustrate substantially the same container but provide different dispensing members. I illustrate for example the three apertures D, $D^1$, and $D^2$ in which are positioned the dispensing members $D^3$, $D^4$, and $D^5$ respectively. Each of these dispensing members is pivoted along an axis $D^6$ adjacent the bottom of the aperture, these axes being perpendicular to the long axis of the container. $D^7$ is any suitable manual handle for moving the dispensing member out. Each dispensing member includes a forward face or closure $D^8$ adapted to close the aperture when the device is in closed position. It has also a converging rear wall $D^9$ adapted to close the aperture when the dispensing member is in dispensing position. These two walls are connected by the arcuate side walls $D^{10}$.

It will be realized that both forms may readily be employed in connection with the sale or dispensing of articles, preferably finely divided articles, which are employed in measured quantities. Taking a can of baking powder as an example I may employ say three of the dispensing members, as shown in either forms of the device, the dispensing members having a volumetric capacity of one-half teaspoon, one teaspoon and two teaspoons respectively. If the user wishes to follow a recipe calling for a teaspoonful of baking powder all that is necessary is to draw out the dispensing member responding to that quantity, and deposit the contents of the dispensing member in any desired container, bowl or the like. As is shown in the figures herein the different sized dispensing members are all positioned at the same level in the can. This is preferable but not always essential. It has for advantage, however, that they may all be positioned at the bottom of the can or container, so that as long as there is any material in the container it will be at a proper level for dispensing. Either form may be applied directly to a container or can, or to a separable dispensing member for application to the container.

It will be realized that whereas I have described and shown a practical and operative device, nevertheless many changes might be made in the size, shape, number and disposition of parts without departing from the spirit of my invention. I therefore wish my description and drawings to be taken as in a broad sense diagrammatic rather than as limiting me to my specific showing.

It will be particularly understood that the shape and size of the container and the purpose of the container and the substance dispensed by the container are a matter of choice and can be widely varied without departing from the spirit of my invention. Also, the number, size and shape of the dispensing members, and their location in relation to the container, may be widely varied.

In the claims it will be understood that where I claim a container I wish the term to be interpreted broadly enough to cover the employment of a dispensing member separate from but applicable to a container, or to the application of my invention directly to the container itself.

My invention is also applicable to other uses than dispensing a loose material. For example, by a mere change in the size and shape of the container, for example, by making the member $A^2$ shorter and putting a cover on it, it becomes admirably adapted for use as a compact. The individual dispensing members may be made of varying sizes or of the same size and they may be filled with a variety of substances, for example, rouge, powder or the like, or powders of various tint where that is desired. It will be understood, therefore, that my invention has a wide applicability to a variety of uses.

I claim:

1. In a dispensing device, a container and a plurality of dispensing members associated therewith, said dispensing members having a variety of different volumetric capacities, said dispensing members being positioned adjacent one end of the container and including spacing portions normally engaging the inner face of the end of the container, said dispensing members being pivoted for rotation about axes generally perpendicular to the end of the container.

2. In a dispensing device, a container and a plurality of dispensing members associated therewith, said dispensing members having a variety of different volumetric capacities, said dispensing members being positioned adjacent one end of the container and including spacing portions normally engaging the inner face of the end of the container, said dispensing members being pivoted for rotation about axes generally perpendicular to the end of the container, and means, associated with an inner portion of each of said dispensing members, for permitting it to be thrust readily into closed position through the material filling the dispensing device.

3. In a dispensing device, a container and a plurality of dispensing members pivoted in relation to the wall of said container, said wall being apertured to permit the passage therethrough of said dispensing members, said dispensing members being adapted to close said apertures when the members are in closed position, said dispensing members having a variety of different volumetric capacities, said dispensing container being in the form of a cylinder, said dispensing members being positioned adjacent the bottom of said cylinder, and having spacing portions normally engaging the inner face of the end of the container and thereby spacing the dispensing members somewhat away from said end, the axes of rotation of said dispensing members being generally perpendicular to the bottom of the cylinder.

4. In a dispensing device, a container and a plurality of dispensing members pivoted in relation to the wall of said container, said wall being apertured to permit the passage therethrough of said dispensing members, said dispensing members being adapted to close said apertures when the members are in closed position, said dispensing members having a variety of different volumetric capacities, the dispensing members being positioned adjacent the bottom of the dispensing device, and having spacing portions normally engaging the inner face of the end of the container and thereby spacing the dispensing members somewhat away from said end, the axes of rotation of said dispensing members being generally perpendicular to the bottom of the cylinder.

5. In a dispensing device, a container having a top and a bottom and a circumferential side wall joining them, a plurality of dispensing members pivoted in relation to the wall of said container, said wall being apertured to permit the passage therethrough of said dispensing members, said dispensing members being provided with spaced portions arranged to close said apertures in the wall when the members are in either open or closed position, all of said dispensing members being in free communication with the interior of said container and opening upwardly for the free fall of material thereinto and being located within said container when they are in closed position, said dispensing members having a variety of different volumetric capacities and being located adjacent one end of the container.

6. In a dispensing device, a container having a top and a bottom and a circumferential side wall joining them, a plurality of dispensing members pivoted in relation to the wall of said container, said wall being apertured to permit the passage therethrough of said dispensing members, said dispensing members being provided with spaced portions arranged to close said apertures in the wall when the members are in either open or closed position, all of said dispensing members being in free communication with the interior of said container and being located within said container and adjacent to the bottom thereof when they are in closed position, said containers opening upwardly for the free fall of material thereinto, said dispensing members having a variety of different volumetric capacities, said container being in the form of a cylinder having generally parallel top and bottom members generally perpendicular to the axis of the cylinder.

7. In a dispensing device, a container having a top and a bottom and a circumferential side wall joining them, a plurality of dispensing members pivoted in relation to the wall of said container, said wall being apertured to permit the passage therethrough of said dispensing members, said dispensing members being provided with spaced portions arranged to close said apertures in the wall when the members are in either open or closed position, all of said dispensing members being in free communication with the open interior of said container and being located within said container when they are in closed position, said dispensing members having a variety of different volumetric capacities and being located adjacent the lower end of the container, said dispensing members opening upwardly for the free fall of material thereinto, said container being in the form of a cylinder having a generally parallel top and bottom generally perpendicular to the axis of the cylinder, said dispensing members being positioned adjacent the bottom of said cylinder, the axes of rotation of said dispensing members being generally perpendicular to the axis of the cylinder.

8. In a dispensing device, a container having a top and a bottom and a circumferential side wall joining them, a plurality of dispensing members pivoted in relation to the wall of said container, said wall being apertured to permit the passage therethrough of said dispensing members, said dispensing members being adapted to close said apertures in the wall when the members are in closed position, all of said dispensing members being in free communication with the open interior of said container and being located within said container when they are in closed position, said dispensing members having a variety of different volumetric capacities and being located adjacent one end of the container, said container being in the form of a cylinder having a generally parallel top and bottom generally perpendicular to the axis of the cylinder, said dispensing members being positioned adjacent the bottom of said cylinder, the axes of rotation of said dispensing members being generally parallel with the bottom of the cylinder and closely adjacent to it.

9. In a dispensing device, a container having a top and a bottom and a circumferential side wall joining them, a plurality of dispensing members pivoted in relation to the wall of said container, said wall being apertured to permit the passage therethrough of said dispensing members, said dispensing members being adapted to close said apertures in the wall when the members are in closed position, all of said dispensing members being in free communication with the open interior of said container and being located within said container when they are in closed position, all of said dispensing members being in free communication with the open interior of said container and being located within said container when they are in closed position, said dispensing members having a variety of different volumetric capacities and being located adjacent one end of the container, said container being in the form of a cylinder having a generally parallel top and bottom generally perpendicular to the axis of the cylinder, said dispensing members being positioned adjacent the bottom of said cylinder, the axis of rotation of said dispensing members being generally parallel with the bottom of the cylinder and closely adjacent to it, and being located somewhat inwardly from the periphery of the cylinder bottom.

10. In a dispensing device, a container having a top, a bottom and a circumferential side wall joining them, said side wall having an aperture adjacent the bottom wall to permit the passage therethrough of a dispensing member, said dispensing member pivoted at one side of said aperture on an axis perpendicular to said bottom wall, said dispensing member being provided with a bottom wall, and inner and outer converging end walls and opening upwardly for the free fall of material thereinto, said dispensing member being located within said container when in closed position.

PETER A. JANSSENS.